US007001469B2

(12) United States Patent
Al-Hakkak

(10) Patent No.: US 7,001,469 B2
(45) Date of Patent: Feb. 21, 2006

(54) PROCEDURE FOR SEPARATING STARCH FROM COMMINUTATES OF PLANT MATERIALS

(75) Inventor: Jafar Al-Hakkak, Bishopdale (NZ)

(73) Assignee: New Zealand Institute for Crop & Food Research Limited, Canterbury (NZ)

( * ) Notice: Subject to any disclaimer, the term of this patent is extended or adjusted under 35 U.S.C. 154(b) by 0 days.

(21) Appl. No.: 10/451,519

(22) PCT Filed: Dec. 19, 2001

(86) PCT No.: PCT/NZ01/00288

§ 371 (c)(1), (2), (4) Date: Dec. 8, 2003

(87) PCT Pub. No.: WO02/051873

PCT Pub. Date: Jul. 4, 2002

(65) Prior Publication Data

US 2004/0076738 A1 Apr. 22, 2004

(30) Foreign Application Priority Data

Dec. 22, 2000 (NZ) ..................................... 509140

(51) Int. Cl.
*C08B 30/04* (2006.01)

(52) U.S. Cl. ........................... 127/67; 127/69; 435/275

(58) Field of Classification Search .................. 127/67, 127/69; 435/275
See application file for complete search history.

(56) References Cited

U.S. PATENT DOCUMENTS 3,980,493 A * 9/1976 Dunne et al. ................. 127/24
4,494,530 A 1/1985 Jansma et al.

FOREIGN PATENT DOCUMENTS

GB 1596742 A 8/1981
JP 08-000201 A 1/1996
SU 939558 A 6/1982

OTHER PUBLICATIONS

Kerr, Chemistry and Industry of Starch, Academic Press Inc, NY, 1950, pp14-17.*
Abstract entitled *A critical examination of procedures for the isolation of barley starch*, May 1988, McDonald, A.M.L. and Stark, J.R., J. of Inst. Brew. 94, pp. 125-132.
PCT International Search Report for App. No. PCT/NZ01/00288, Feb. 21, 2002, Australian Patent Office.

* cited by examiner

*Primary Examiner*—David Brunsman
(74) *Attorney, Agent, or Firm*—Thompson Coburn LLP

(57) ABSTRACT

A process of producing starch from plant material is provided which involves adding extraneous protein to the plant material. This produces a network of protein. The starch is isolated from the protein network/plant material mixture.

18 Claims, 1 Drawing Sheet

PROCEDURE FOR SEPARATING STARCH FROM COMMINUTATES OF PLANT MATERIALS

This application is a 371 filing of PCT/NZ01/00288, filed 19 Dec. 2001.

FIELD OF INVENTION

The invention relates to the production of starch and more particularly to the fractionation of food grade starches and novel protein from plant materials that contain starch and protein. More particularly the invention relates to the admixture with wheat gluten to bind plant proteins and reduce their solubility in water.

BACKGROUND

Starch is an industrial and food raw material of major importance. Starch for food use is commonly extracted from starchy plant constituents (cereal grains, seeds, tubers) using procedures that involve reducing the plant material to fine particles, washing the starch from the insoluble plant material as a suspension in water, then removing the starch from the suspension, usually by a process involving filtering or centrifugation in some form. To obtain starch of high purity, it is important that the non-starch plant materials have, or can be made to have, differences in solubility or density, compared to the starch.

The process of separating starch from insoluble and soluble components of plants is an important step for obtaining purified starch, but it is also important for the isolation of other plant components that may be valuable, where removal of the starch is a required step.

Industrial extraction of starch using procedures based on the above principle is applied in various forms. For example, starch is isolated from potatoes and cassava by rasping the raw material to open the plant cells, reducing the solubility of proteins by reaction with sulphur dioxide or sodium bisulphate, then washing and extracting the starch. Starch is isolated from maize (*zea mays*) by steeping then wet milling the corn to remove the germ and husk, fine grinding, then applying centrifugal separation and filtering techniques to separate the starch from the proteins. Starch is isolated from wheat by mixing milled wheat flour with water to a dough then washing the starch from the insoluble wheat gluten.

Starch may also be isolated from plant materials by non-aqueous extractions. For example, in a review of procedures for obtaining starch from barley, McDonald and Stark (1) identified several procedures, but considered none food safe or industrially applicable.

The aqueous separation processes described above are applicable to a limited number of plants, and thus most industrial starch is made from only four sources: potatoes, cassava, maize and wheat. Rice starch can be isolated from rice using a process involving steeping in alkaline solution, but with low efficiency. The main barrier to extraction of starch from other plant sources is the difficulty in reducing the solubility of large non-starch plant polymers sufficiently to allow separation from the starch.

OBJECT OF THE INVENTION

The main object of this invention is to provide an aqueous method for isolating starch from plant materials that do not yield good separations under current industrial methods. The method may be used for the purpose of separating and purifying the starch, or for the purpose of removing the starch as a step in isolation of other plant materials such as β-glucan and novel proteins.

SUMMARY OF THE INVENTION

The invention provides a process of producing starch from a plant material other than wheat which comprises adding extraneous protein to the plant material to produce a network of protein, and isolating the starch from the protein network mixture.

The extraneous protein added to the plant material is preferably gluten and more preferably wheat gluten.

The gluten material may be wholly or partially generated in the plant material by expression of genetic material originally from wheat species.

The properties of the protein network/plant material mass may be modified by the addition of salt.

The properties of the protein network/plant material mass may be modified by mixing in the presence of agents to enhance cross linking of gluten through oxidizing reactions.

The properties of the protein network/plant material mass may be modified by mixing in the presence of transglutaminase or other enzymes known to cross link gluten proteins.

The properties of the protein network/plant material mass may be modified by mixing in the presence of an aldehyde reagent known to cross link gluten proteins.

The plant material may be, or may be derived from: a cereal/grain other than wheat; pulse; a plant seed; or a fruit. The plant material is preferably oat, rye or barley.

The plant material is preferably in the form of a flour prior to the addition of extraneous protein.

The starch may be subsequently isolated from the protein/plant material mass by any known means.

In particular, the invention provides a method of extracting starch from a plant material other than wheat comprising the steps of:

(a) mixing comminuted plant material with wheat gluten and water to form a coherent mass; and (b) washing the starch from the coherent mass with water.

The starch may be subsequently isolated by sedimentation, filtration, centrifugation, evaporation or a combination or modification of these processes.

Preferably a dough is prepared from the combination of gluten and plant material allowing the gluten/plant material mixture to rest for 10–30 minutes.

Preferably a weight ratio of 50–80% water to ground plant material is used.

Preferably starch is washed out of the dough by:

kneading the dough, while it is covered with water to permit the release of the starch granules; and recovering the starch granules by filtration through a coarse mesh, which retains the protein mass and allows the starch suspension to pass through.

Starch granules may be centrifuged from the wash liquor by:

centrifugation of the wash liquor to isolate the starch as a solid cake and drying the white starch cake.

The invention also provides starch when produced by any of the above methods.

Thus the invention provides a process of producing starch which is non-destructive and non-toxic.

The present invention comprises reducing the solubility of plant proteins and other long polymers by forming an insoluble network with wheat gluten in the form of a coherent wet mass from which the starch may be washed.

The inventive discovery is that plant proteins bound by entanglement or cross linked with gluten by this process are sufficiently insoluble in water to enable starch of high purity to be washed from the network without significant contamination from soluble proteins. The starch may then be isolated from the water-soluble components and any other suspended materials by known methods.

The invention provides at least five significant advantages. First, it can be applied successfully to separate starch from a number of sources. Starch has been successfully isolated starch from barley, oats, rye, triticale, rice, green peas, split peas, amaranth and bananas using this procedure. The critical limitation is the capability of the process to form a stable coherent mass when the finely divided plant material and wheat gluten are mixed in the presence of water. It is unlikely that this list of applications is exhaustive, and they represent isolation of starch from cereal grains, seeds, pulses and a fruit.

Second, the process produces starch of high purity, often at high recovery. For example, using simple bench top sedimentation and filtration equipment yielded starch of 99.5%, 99.5%, 99.3%, 99.0%, 98.9%, 98.4% and 97.6% purity on a dry weight basis, from rye, split peas, triticale, oats, rice, green peas, and amaranth respectively. Higher purities would be anticipated from more sophisticated industrial filtration equipment.

Third, the process can provide high yields. Starch yields exceeding 95% of theoretical were obtained for the cereal grains oat, barley, triticale. Starch yields of 40% to 50% of theoretical were obtained from rice, amaranth, and split and green peas. These yields were obtained on simple sieving and filtering equipment and are not considered to represent the limit of extraction efficiency.

Fourthly, the process is compatible with food, cosmetic, or pharmaceutical use. The process requires no chemicals or chemical modification of the starch, and may be carried out under neutral conditions with water as the only solvent.

Finally, the process is compatible with current industrial procedures for manufacturing wheat starch.

BRIEF DESCRIPTION OF DRAWINGS

The invention will now be described with reference to the accompanying drawings in which.

Figure 1:
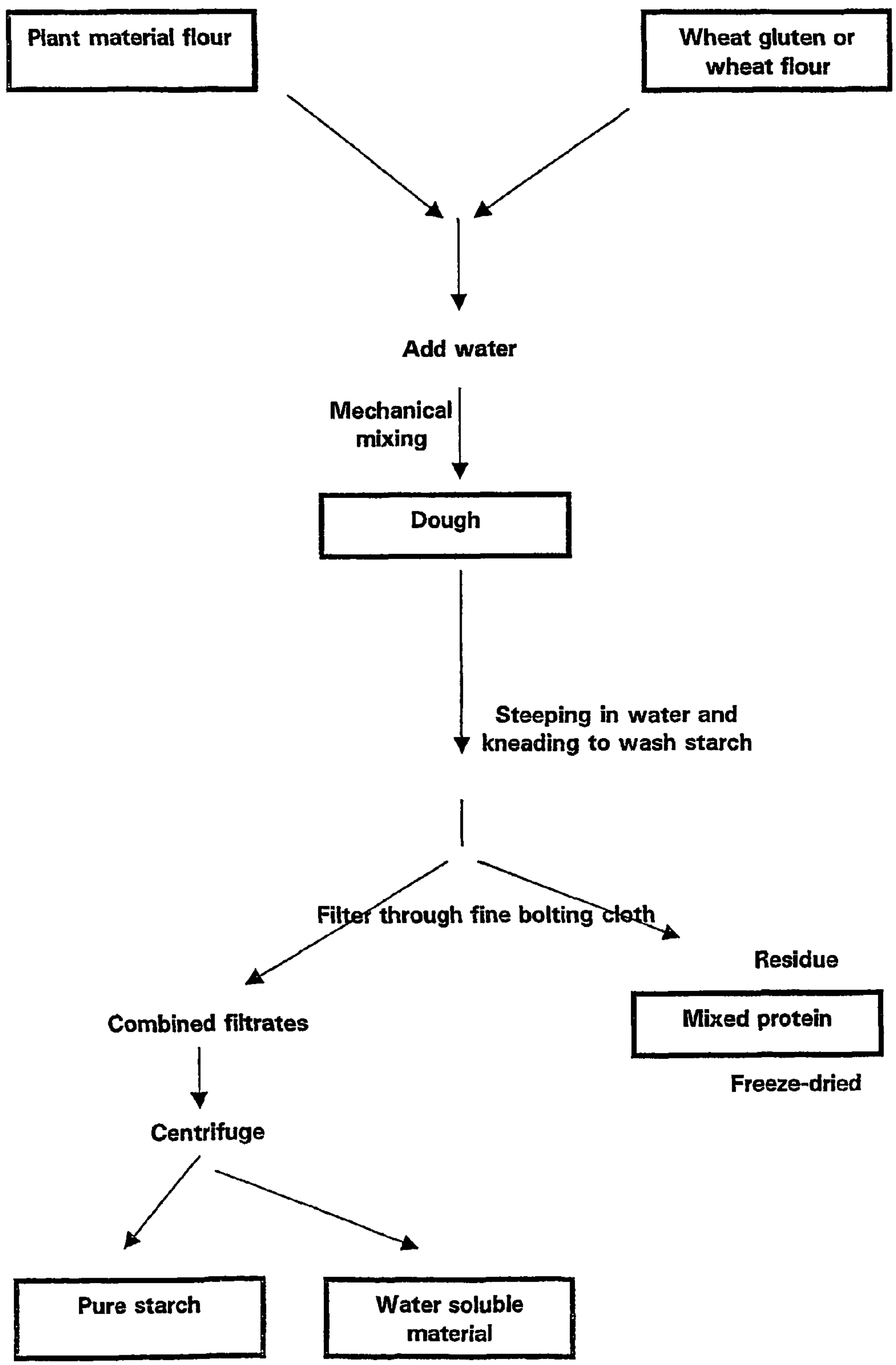
FIG. 1 is a flow diagram of the preferred process

It will be appreciated that while the invention has been described with reference to the above example and drawing, numerous variations and modifications may be made without departing from the scope of the invention as set out in this specification.

DETAILED DESCRIPTION OF THE INVENTION

The present invention relates to converting finely divided plant material containing starch, into a coherent mass with wheat gluten, then removing the starch from the mass by washing it out with water. The starch may then be separated from the water by any means, for example decantation, centrifugation, filtration, evaporation.

An important feature of the invention is that it is effective on a broad range of starchy plant materials. These include but are not limited to, the cereal grains barley, oats, rye, rice, triticale, and maize; other seeds, exemplified by amaranth; pulses, exemplified by split pea and green pea; and fruit, exemplified by banana.

A flow diagram of the process is given in FIG. 1.

The process requires the plant material to be finely divided and mixed with water. If the plant material has a low moisture content, the material may be comminuted to form a powder, for example, by roller milling of cereal grains. If the plant material has a high moisture content, it may be macerated to form a pulp or slurry.

Materials

Wheat Gluten

The wheat gluten used in this work was WHETPRO.75 from "Les Minoteries Ogilvie Itee" Montreal, Canada, and gluten prepared in our laboratory by washing it from flour-water dough by kneading under frequent changes of water until most of the starch was removed. Both glutens gave similar results in starch isolation experiments.

Grain Flours

Rice flour was from a local supermarket. Oat, Rye flour were purchased from New Zealand BioGrains Ltd, Ashburton. They were sieved in the laboratory through 125 μm to remove coarse particles. Barley and Triticale were Crop & Food research experimental cultivars, milled using a Brabender Quadrumat Junior laboratory flour mill.

Seed Flour

Amaranth flour was from New Zealand BioGrain, sieved in the laboratory through 125 μm mesh.

Legumes

Pea and split pea flours were from a local supermarket.

Fruit

Green bananas were from a local supermarket. They were peeled and sliced to ca. 3 cm pieces, freeze dried, then milled to flour using a laboratory mill.

Other Chemicals

Salt was food grade industrial salt. Ascorbic acid was from Takeda Chemical Industries Ltd, Osaka, Japan. Transglutaminase was from Ajinomoto, Japan.

EXAMPLE 1

Methods

The standard method involved mixing flour of the desired materials with wheat gluten and water to make a firm dough. This dough was left to stand at room temperature for 30–45 minutes. It was then kneaded under water to release the starch from the matrix of proteins. This washing step was repeated until additional yields from subsequent washings became insignificant. The starch suspension from the washing step was filtered using nylon mesh (45–75 μm). The filtrate was centrifuged at 3000 g for 20 minutes to produce a pellet comprised of a thin top layer of often discolored material mixed composition on top of pure starch. The top layer was carefully scraped off, and the starch air-dried in a warm drying oven. In some runs, salt or/and ascorbic acid (AA) or/and transglutaminase (TGA) were used to modify the dough properties to produce stronger dough. To evaluate the process, a range of flours derived from plant materials were taken through the standard process with varying ratios of added gluten, salt, ascorbic acid and transglutaminase. The starch yields were calculated based by comparing the air dry starch with the analysed starch content of the dry flour (moisture levels of starch and flour were usually within 1%). The starch was analysed for purity by measuring protein, fat and pentosan contents.

EXAMPLE 2

Isolation of Starch from Oat Flour

Oat flour was sieved through a 125μ mesh prior to use, in order to remove coarse bran.

A total sample (50 gm) of flour and gluten was mixed using a farinograph mixer. The resultant dough was left to rest for 30 min.

This step was repeated with different formulations of Oat flour with gluten, salt and ascorbic acid (tables 1–4). The doughs were kneaded under water to release the starch granules, then the dough suspension was filtered through 45μ mesh nylon cloth. The dough was washed sequentially in the same way (4–6) times, or until no further starch is released from the dough. The filtrates were combined and the starch isolated from them by centrifugation. The starch pellet had a light brown coloured top layer, which was readily removed by scraping to leave the pure starch behind. The water-soluble fraction was recovered from the combined aqueous layers by freeze drying for further analysis. The results shown in tables 1–4 indicate that the optimum procedure for Oat starch isolation under these conditions, in terms of yield and purity, was with 18% gluten and 3% salt.

TABLE 1

Isolation of starch from Oat by the addition of gluten only

| | | starch analyses | | | | | |
|---|---|---|---|---|---|---|---|
| sample | % added gluten | Add water % | Yield % | Protein % | Fat % | pentosan % | comments |
| 1 | 10% gluten | 70.0 | 34.18 | 0.94 | | 0.00 | very weak dough |
| 2 | 13% gluten | 71.0 | 46.85 | 0.54 | | 0.00 | same |
| 3 | 15% gluten | 71.8 | 50.40 | 0.45 | 0.99 | 0.00 | weak dough |
| 4 | 18% gluten | 73.0 | 51.44 | 0.41 | 0.85 | 0.00 | same |
| 5 | 18% gluten | 73.0 | 54.07 | 0.43 | | 0.00 | same |
| 6 | 20% gluten | 74.5 | 69.10 | 0.38 | 0.77 | 0.10 | strong dough |
| 7 | 22% gluten | 76.0 | 66.62 | 0.39 | | 0.13 | same |
| 8 | 24% gluten | 77.5 | 69.13 | 0.33 | | 0.17 | same |

TABLE 2

Isolation of starch from Oat by the addition of gluten and salt

| | Analyses of isolated starch | | | | | |
|---|---|---|---|---|---|---|
| Samples % Added gluten & salt | Add water % | Yield % | Protein % | Fat % | pentosan % | Comments |
| 15% gluten + 1% salt | 69.8 | 52.23 | 0.23 | 1.04 | 0 | weak dough |
| 15% gluten + 1% salt | 69.1 | 58.02 | 0.43 | — | 0 | same |
| 15% gluten + 2% salt | 66.8 | 57.67 | — | 1.05 | 0 | same |
| 15% gluten + 3% salt | 63.6 | 61.06 | 0.43 | — | 0 | same |
| 15% gluten + 3% salt | 65.0 | 60.12 | 0.51 | 1.02 | 0 | weak-strong |
| 15% gluten + 4% salt | 63.2 | 54.82 | 0.58 | 0.94 | 0 | same |
| 16% gluten + 3% salt | 65.9 | 62.45 | 0.53 | 0.64 | 0.16 | same |
| 18% gluten + 2% salt | 69.3 | 73.51 | 0.47 | — | 0.06 | strong |
| 18% gluten + 3% salt | 67.5 | 72.76 | 0.54 | 0.67 | 0 | strong |

TABLE 3

Isolation of starch from Oat by the addition of gluten, salt and ascorbic acid

| | starch analyses | | | | | |
|---|---|---|---|---|---|---|
| Samples | Add water % | Yield % | Protein % | Fat % | pentosan % | comments |
| 15% gluten + 3% salt + 200 ppm AA | 65.0 | — | — | — | — | Weak dough |
| 15% gluten + 3% salt + 300 ppm AA | 65.8 | — | — | — | — | same |
| 16% gluten + 3% salt + 200 ppm AA | 64.0 | 59.26 | 0.41 | 0.70 | 0.00 | weak-strong |
| 16% gluten + 3% salt + 300 ppm AA | 64.6 | 61.55 | 0.39 | 0.70 | 0.04 | same |
| 18% gluten + 3% salt + 200 ppm AA | 65.8 | 62.80 | 0.33 | 0.54 | 0.15 | strong |
| 18% gluten + 3% salt + 300 ppm AA | 65.8 | 57.88 | 0.40 | 0.66 | 0.00 | Strong-weak |

TABLE 4

Optimum condition for isolation of starch from Oat

| samples | Add water % | Yield % | Protein % | Fat % | pentosan % | comments |
|---|---|---|---|---|---|---|
| 18% gluten + 3% salt | 67.5 | 71.71 | 0.30 | 0.55 | 0.30 | Strong |
| 18% gluten + 3% salt + 200 ppm Asc | 62.5 | 62.80 | 0.33 | 0.54 | 0.15 | Strong |
| 20% gluten | 74.5 | 71.27 | 0.56 | | 0.22 | Strong |

EXAMPLE 3

Isolation of Starch from Rye Flour

The commercial rye flour was sieved through a 125μ screen to remove coarse bran and other coarse particles.

In a range of experiments analogous to the oat investigations, samples (50 gm) of rye flour and gluten and other dry materials were mixed in a farinograph mixer with sufficient water to form a coherent dough. The dough was left to rest for 30 min. The dough was kneaded under water to release the starch granules into the water, and the dough suspension retrieved by filtering through 72μ mesh nylon cloth. The dough was washed sequentially 4–6 times, or until no further starch is released from the dough. The filtrates were combined and the starch isolated by centrifugation then careful removal of the light brown top layer by physical scraping. The pure starch was air dried under gentle conditions.

The water-soluble recovered from the combined aqueous layers was freeze-dried for further analysis.

As for oats, this procedure was repeated with varying levels of salt, ascorbic acid and transglutaminase to determine the optimum condition for extraction of starch from rye flour in our laboratory. Tables 5–8 present the extraction yield data and purity calculations for rye starch. These, which indicate optimum conditions to be 17.5% gluten and 3% salt, with wide tolerances around the optimum.

TABLE 5

Isolation of starch from Rye flour by the addition of gluten

| samples | Add water % | Yield % | Protein % | Fat % | pentosan % | comments |
|---|---|---|---|---|---|---|
| 5% gluten | 63.0 | 8.76 | 0.41 | — | 0 | Very weak |
| 10% gluten | 65.0 | 11.36 | 0.18 | 0.9 | 0 | Weak |
| 15% gluten | 69.5 | 29.41 | 0.00 | 0.83 | 0 | weak-strong |
| 20% gluten | 73.0 | 32.53 | 0.08 | 0.8 | 0 | Strong |

TABLE 6

Isolation of starch from Rye flour by the addition of gluten and salt

| Samples | Add water % | Yield % | Protein % | Fat % | pentosan % | comments |
|---|---|---|---|---|---|---|
| 15% gluten + 2% salt | 65.0 | 38.82 | 0.035 | 0.45 | 0 | Strong-weak |
| 17.5% gluten + 2% salt | 66.0 | 44.56 | 0.000 | 0.51 | 0 | same |
| 20% gluten + 2% salt | 70.0 | 59.43 | 0.017 | — | 0 | Strong |
| 15% gluten + 3% salt | 63.0 | 37.93 | 0.017 | 0.61 | 0.1 | same |
| 17.5% gluten + 3% salt | 68.0 | 44.61 | 0.041 | 0.61 | 0 | same |
| 20% gluten + 3% salt | 67.5 | 54.93 | 0.076 | | 0 | same |

TABLE 7

Isolation of starch from Rye flour using gluten, salt, AA and TGA

| samples | Add water % | Yield % | Protein % | Fat % | pentosan % | comments |
|---|---|---|---|---|---|---|
| 15% gluten + 3% salt + 300 ppm AA | 60.0 | 52.19 | 0.030 | 0.46 | 0 | Strong-weak |
| 15% gluten + 3% salt + 5000 ppm TGA | 62.0 | 50.58 | 0.530 | 0.78 | 0.91 | Strong-weak |
| 15% gluten + 3% salt + 300 ppm AA + 5000 ppm TGA | 63.0 | 40.73 | 0.090 | | 0 | same |
| 16% gluten + 2% salt + 300 ppm AA + 5000 ppm TGA | 58.5 | 35.67 | 0.1611 | 0.47 | 0 | same |
| 16% gluten + 3% salt + 300 ppm AA + 5000 ppm TGA | 59.5 | 45.29 | 0.090 | | 0 | same |
| 17.5% gluten + 2% salt + 300 ppm AA + 5000 ppm TGA | 58.5 | 37.58 | 0.035 | | 0 | same |
| 17.5% gluten + 3% salt + 300 ppm AA | 64.0 | 53.55 | 0.064 | | 0 | Strong |
| 17.5% gluten + 3% salt + 300 ppm AA + 5000 ppm TGA | 62.0 | 35.76 | 0.090 | | 0 | same |

TABLE 8

Isolation of starch from Rice flour

| samples | Add water % | Yield % | Protein % | Fat % | comments |
|---|---|---|---|---|---|
| 14% gluten | 67.0 | 41.19 | 0.28 | 1.01 | Weak-strong |
| 14% gluten + 2% salt | 65.5 | 33.56 | 0.26 | | Strong-weak |
| 15% gluten + 2% salt | 66.6 | 39.94 | 0.25 | 0.77 | Strong |
| 16% gluten | 72.5 | 38.98 | 0.25 | 0.86 | Strong |
| 16% gluten + 2% salt | 68.5 | 35.10 | 0.31 | | Very strong |
| 16% gluten + 2% salt 200 ppm Asc | 65.2 | 39.60 | 0.25 | 0.77 | Very strong |
| 18% gluten | 73.5 | 34.66 | 0.36 | | strong |
| 18% gluten + 2% salt | 69.0 | 34.59 | 0.26 | | very strong |
| 20% gluten + 3% salt | 70.4 | 27.45 | 0.32 | 0.90 | same |

EXAMPLE 4

Scaling Up the Starch Extraction from Rye Flour

The optimum extraction method, (Rye flour+17.5% gluten+3% salt) was scaled up 10, 20 and 40—fold in the laboratory by using 500 gm, 1 kg and 2 kg of dry materials respectively. These trials were carried out using in a Hobart mixer using the same procedure as before. The doughs were left to rest for 40 min. The large scale procedures gave starch of similar purity to the small scale trials, with yields ranging from 42.25%–46.5%.

EXAMPLE 5

Isolation of Starch from Rice Flour

As in earlier runs, total sample of 50 gm of the rice flour and other dry ingredients was mixed with sufficient water to form a firm, coherent dough, in a farinograph mixer. Dough formation was improved if samples were left to stand for 2–3 minutes before mixing to allow hydration of materials. A dough rest time of 30 minutes was used, then the dough kneaded under water to release the starch into the water as before. Five to six sequential washings were required. The starch was recovered by filtration and centrifugation of the filtrate. Again, a range of salt and ascorbic acid levels were investigated, as shown in table 8.

EXAMPLE 6

Isolation of Starch from Barley and Triticale

The same method used on above grains were used to isolate starch from barley and Triticale. The results were similar to those of Rye flour. With the triticale used, the levels of extraneous gluten required fell to 6%, the genetically transferred wheat gluten present in the triticale providing the remainder of the gluten necessary.

EXAMPLE 7

Isolation of Starch from Legumes

Pea and split pea flour were treated in the same manner as above. The resulting doughs were left to rest for 60 minutes longer than those for grain flours. The dough was kneaded under water for 4–5 times and then filtered through 49$\mu$ mesh. The filtrate was left to stand for 45 minutes and the coloured upper layer was decanted from the starch layer, which was then centrifuged. The top coloured layer of the starch pellet was scraped off leaving pure starch behind. In general all Legumes needed more added gluten in order to make a firm dough that could stand kneading in water. The brown coloured layer on top of the starch pellet as slightly thicker for legumes than that in all the grains (Table 9). Use of transglutaminase with legumes flour improved starch purity.

TABLE 9 isolation of starch from Pea and Split Pea

| samples | Add water % | Yield % | Protein % | Fat % | Pentosan % | comments |
|---|---|---|---|---|---|---|
| Split pea + 15% gluten + 3% salt | 67.5 | | | | | No dough |
| Split pea + 16% gluten + 3% salt + 300 ppm Asc | 65.5 | 23.90 | 1.05 | | 0.20 | Weak dough |
| Split pea + 20% gluten | 76.0 | 26.30 | — | 0 | 0.00 | Weak dough |
| Split pea + 20% gluten + 3% salt | 74.0 | 19.63 | — | | 0.40 | |
| Split pea + 20% gluten + 3% salt + 300 ppm Asc | 70.0 | 37.55 | 1.28 | 0.01 | 0.20 | Weak-strong |
| Split pea + 20% gluten + 3% salt + 5000 TGA | 74.0 | 21.35 | 1.30 | | 0.20 | Strong-weak |
| Split pea + 20% glu + 3% salt 300 AA + 5000 TGA + 300 ppm Asc | 71.0 | 32.80 | 0.59 | 0 | 0.00 | Weak-strong |
| Pea + 20% gluten | 77.0 | 12.25 | 0.96 | 1.23 | 0.00 | Weak |
| Pea + 20% gluten + 3% salt | 74.0 | 21.20 | — | | 0.20 | Weak |
| Pea + 20% gluten + 3% salt + 300 ppm AA | 69.0 | 18.90 | 1.28 | 0.15 | 0.30 | Strong-weak |
| Pea + 20% gluten + 3% salt + 5000 TGA | 74.0 | 18.50 | 3.70 | 0.13 | 0.40 | same |
| Pea + 20% glu + 3% salt 300 AA + 5000 TGA | 71.0 | 18.80 | 3.58 | 0.18 | 0.80 | same |

EXAMPLE 8

Isolation of Starch from Seed (Amaranth)

A sample of amaranth flour was processed using the standard procedure. The results are shown in table 10.

| samples | Add water % | Yield % | Protein % | Fat % | pentosan % | comments |
|---|---|---|---|---|---|---|
| 18% gluten | 78.4 | 15.73 | 2.70 | — | 0.00 | Weak dough |
| 18% gluten + 3% salt | 73.0 | 19.63 | 5.54 | — | 0.40 | Weak-strong |
| 18% gluten + 3% salt | 75.4 | 18.66 | 2.32 | — | Tr. | Same |
| 18% glu + 3% salt + 200 AA | 71.0 | 20.29 | 6.08 | 0.82 | Tr. | Weak |
| 20% gluten | 80.0 | 24.38 | 4.35 | — | 0.00 | Strong-weak |
| 20% gluten + 3% salt | 77.0 | 26.45 | 4.66 | 0.47 | 0.00 | Strong |
| 20% gluten + 200 ppm | 75.0 | 22.50 | 2.47 | — | 0.00 | Strong-weak |
| 20% glu + 3% salt + 200 AA | 72.0 | 25.70 | 2.78 | 0.35 | 0.00 | Strong |

-continued

| samples | Add water % | Yield % | Protein % | Fat % | pentosan % | comments |
|---|---|---|---|---|---|---|
| 9–20% gluten + 2% salt + 300 ppm AA + 5000 TGA | 73.0 | 23.03 | 1.82 | — | — | same |

EXAMPLE 9

Isolation of Starch from Fruit

Banana, not fully ripened (green), purchased from a local supermarket was used in this experiment. To obtain flour, the skin was removed and the flesh sliced, freeze dried and ground to a flour using a laboratory mill. A total sample (50 gm) of banana and gluten (20–30%), was mixed with salt (3%), in a Brabender mixer. The dough was left to rest for 60 minutes, then steeped in water and kneaded to release the starch into the water. The washing step was repeated three times, the wash waters combined, then filtered through a 49$\mu$ mesh nylon cloth. The starchy water was then centrifuged at 3500 g for 20 min. the starch pellet was scraped from the top brown layer, the pure starch was then air-dried to give a yield of 12%.

The analyses of Banana starch showed no pentosans, 0.15% proteins and 0.35% fat.

References (1) McDonald, A. M. L., and Stark, J. R. A critical examination of procedures for the isolation of barley starch J. of Inst. Brew. 94, 125–132, 1988.

Industrial Applicability

The invention provides a process of producing starch from a number of plant materials. The starch can be used industrially as a food or as an industrial raw material.

What is claimed is:

1. A process of producing starch from a plant material other than wheat which comprises adding extraneous protein to the plant material to produce a network of protein and isolating the starch from the protein network mixture.

2. A process according to claim 1 wherein the extraneous protein is gluten.

3. A process according to claim 2 wherein the gluten is wheat gluten.

4. A process according to claim 2 wherein the gluten is wholly or partially generated in the plant material by expression of genetic material originally from wheat species.

5. A process according to claim 1 wherein the network of protein is produced by a mixing action.

6. A process according to any one of claim 1 wherein the protein network mixture is modified by the addition of salt.

7. A process according to claim 1 wherein the protein network mixture is modified by mixing in the presence of agents to enhance cross linking of gluten through oxidizing reactions.

8. A process according to claim 7 wherein the protein network mixture is modified by mixing in the presence of transglutaminase or other enzymes known to cross link gluten proteins.

9. A process according to claim 7 wherein the plant network mixture is modified by mixing in the presence of an aldehyde reagent known to cross link gluten proteins.

10. A process according to claim 1 in which the plant material is cereal/grain other than wheat, a pulse, a plant seed or a fruit.

11. A process according to claim 10 in which the cereal/grain is oat, rye or barley.

12. A process according to claim 10 in which the cereal/grain is triticale.

13. A process according to claim 1 wherein the plant material is in the form of a flour prior to the addition of extraneous protein.

14. A method of extracting starch from a plant material other than wheat, comprising the steps of:

(a) mixing comminuted plant material with wheat gluten and water to form a coherent mass; and (b) washing the starch from the coherent mass with water.

15. A process according to any preceding to claim 14 wherein the starch is isolated from the protein/plant material mass by sedimentation, filtration, centrifugation, evaporation or a combination or modification of these processes.

16. A method according to claim 14 wherein a dough is prepared from the combination of gluten and plant material allowing the gluten/plant material mixture to rest.

17. A method according to claim 14 wherein a weight ratio of 50–80% water to ground plant material is used.

18. A method according to claim 14 wherein the starch is washed out of the dough by:

kneading the dough, while it is covered with water, to permit the release of the starch granules; and recovering the starch granules by filtration through a coarse mesh, which retains the protein mass and allows the starch suspension to pass through.

* * * * *